United States Patent
Thomas

(10) Patent No.: US 9,723,246 B2
(45) Date of Patent: Aug. 1, 2017

(54) HOUSING USED TO PRODUCE A HOLOGRAPHIC IMAGE

(71) Applicant: Robert Thomas, Montville, NJ (US)

(72) Inventor: Robert Thomas, Montville, NJ (US)

(73) Assignee: Robert Thomas, Montville, NJ (US)

( * ) Notice: Subject to any disclaimer, the term of this patent is extended or adjusted under 35 U.S.C. 154(b) by 189 days.

(21) Appl. No.: 14/688,565

(22) Filed: Apr. 16, 2015

(65) Prior Publication Data
US 2016/0306323 A1  Oct. 20, 2016

(51) Int. Cl.
*H04N 5/64* (2006.01)
*G02B 27/22* (2006.01)

(52) U.S. Cl.
CPC ........... *H04N 5/64* (2013.01); *G02B 27/2292* (2013.01)

(58) Field of Classification Search
CPC .................................. G03H 1/00; H04N 5/64
USPC ........................................................... 348/40
See application file for complete search history.

(56) References Cited

U.S. PATENT DOCUMENTS

| | | | | |
|---|---|---|---|---|
| 3,424,366 A * | 1/1969 | Williamson | ......... | B65D 5/2009 206/497 |
| 6,220,555 B1 * | 4/2001 | Chase | ..................... | A47F 5/112 248/174 |
| 2003/0184829 A1 * | 10/2003 | Odhner | ................ | G02B 5/1842 359/15 |
| 2003/0184831 A1 * | 10/2003 | Lieberman | ............... | G03H 1/22 359/32 |
| 2004/0083631 A1 * | 5/2004 | Zakova | ...................... | G09F 1/06 40/124.16 |
| 2006/0279815 A1 * | 12/2006 | Rathus | ................. | G03H 1/0005 359/1 |
| 2009/0020595 A1 * | 1/2009 | Krogh | .................. | B65D 5/4204 229/116.5 |
| 2009/0138805 A1 * | 5/2009 | Hildreth | ............. | G06K 9/00335 715/745 |
| 2009/0284489 A1 * | 11/2009 | Batchko | ............. | H04N 13/0488 345/173 |
| 2010/0053617 A1 * | 3/2010 | Mori | .................. | G02B 27/2214 356/401 |
| 2010/0097439 A1 * | 4/2010 | Kroll | .................... | G03H 1/0005 348/14.02 |

(Continued)

OTHER PUBLICATIONS

Petrova et al, Basic Holographic Characteristics of Panchromatic Light Sensitive Material for Reflective Auto Stereoscopic 3D display, 2007.*

(Continued)

*Primary Examiner* — Shan Elahi

(57) ABSTRACT

A holographic producing housing includes a base panel having a first side, a second side opposite the first side, a back end and a front end opposite the back end. The housing further includes a first and second side panels vertically extending from the first and second side of the base panel. A back panel vertically extends from the back end of the base panel and a floor panel extends partially upwards from the front end of the base panel. A front opening is formed leading into the housing. The first side panel and the second side panel each include an aligning diagonal slot to receive and secure a reflective window within. A receiver is formed on the housing to secure an electronic video playing device within so that a screen of the electronic video playing device is directed towards the reflective window at an angle.

14 Claims, 5 Drawing Sheets

(56) References Cited

U.S. PATENT DOCUMENTS

| | | | | |
|---|---|---|---|---|
| 2010/0238270 A1* | 9/2010 | Bjelkhagen | ........ | H04N 13/0402 348/45 |
| 2011/0211256 A1* | 9/2011 | Connor | .............. | G02B 27/2285 359/463 |
| 2012/0050459 A1* | 3/2012 | Yoon | ....................... | G02B 27/22 348/40 |
| 2012/0247693 A1* | 10/2012 | Hill | ........................... | G09F 1/06 160/368.1 |
| 2013/0215222 A1* | 8/2013 | Tsukagoshi | ........ | H04N 13/0022 348/43 |
| 2013/0215235 A1* | 8/2013 | Russell | .............. | H04N 13/0203 348/47 |
| 2014/0036329 A1* | 2/2014 | Kang | ................... | G03H 1/2294 359/9 |
| 2014/0267598 A1* | 9/2014 | Drouin | ................. | G03H 1/0005 348/40 |

OTHER PUBLICATIONS

Lehtimaki et al, Evaluation of perceived quality attributes of digital holograms viewed with a stereoscopic display, 2010.*

* cited by examiner

HOUSING USED TO PRODUCE A HOLOGRAPHIC IMAGE

BACKGROUND OF THE INVENTION

The present invention relates to holographic images and, more particularly, to a housing used to produce a holographic image.

Pepper's ghost is an illusion technique used in theatre, haunted houses, dark rides, and magic tricks. It is named after John Henry Pepper, a scientist who popularized the effect in a famed demonstration in 1862. The basic trick involves a stage that is specially arranged into two rooms, one that people can see into or the stage as a whole, and a second that is hidden to the side, the "blue room." A plate of glass or plastic film is placed somewhere in the main room at an angle that reflects the view of the blue room towards the audience. Generally this is arranged with the blue room to one side of the stage, and the plate on the stage rotated around its vertical axis at 45 degrees.

When the lights are bright in the main room and dark in the blue room, the reflected image cannot be seen. When the lighting in the blue room is increased, often with the main room lights dimming to make the effect more pronounced, the reflection becomes visible and the objects within the blue room seem to appear in thin air. A common variation uses two blue rooms, one behind the glass and one to the side, which can be switched visible or invisible by alternating the lighting.

Current 3D Peppers Ghost hologram display devices are designed primarily for the commercial display fields. These devices are aimed towards the professional audio visual technician who sets up at an amusement park, museum display or point-of-purchase professional displays for retail and convention exhibits. Therefore, current Peppers ghost hologram are not accessible to the average child at a place of residence.

As can be seen, there is a need for a portable and easily constructible Peppers Ghost hologram apparatus.

SUMMARY OF THE INVENTION

In one aspect of the present invention, a holographic producing housing comprises: a base panel having a first side, a second side opposite the first side, a back end and a front end opposite the back end, wherein the base panel is formed to rest on a surface to support the housing in an upright position; a first side panel extending from the first side of the base panel and a second side panel extending a second side of the base panel; a back panel extending from the back end of the base panel; a floor panel extending partially upwards from the front end of the base panel forming an opening into the housing in between an upper edge of the floor panel, and front edges of the first side panel and the second side panel; and a light secured within the housing and positioned to direct light on the back panel, wherein the first side panel and the second side panel each comprise an aligning diagonal slot extending from the back end to the front end and sized to receive and secure a reflective window within, wherein a receiver is formed on the housing to secure an electronic video playing device within so that a screen of the electronic video playing device is directed towards the reflective window at an angle from about 40 degrees to about 50 degrees.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

The present invention may include a one-piece assembly, economically designed and child-friendly Peppers ghost hologram 3D display apparatus with pre-programmed video applications. The present invention is a child friendly, easy-to-assemble, video imaging apparatus directed towards the general viewing public providing an extraordinary entertaining experience while viewing a magical Peppers ghost 3D hologram show.

The present invention includes an easier way to assemble and provide a 3D hologram viewing apparatus to entertain and educate the viewing audience. The present invention has been designed to be so simple to assemble and operate, economically affordable, and targeted directly to the general public. In certain embodiments, the viewing apparatus may come with its own corresponding entertaining and educational storyboard application titles available for various tablets and other similar devices.

The present invention may be designed directly for the general public use while using this new personal video imaging apparatus. The present invention is accessible to the public while being child-friendly, light weight, simple all-one-piece assembly. The present invention may be simple to put together and resemble a folding carton. The apparatus is stored flat, and may be folded along the crease lines. The sides may be joined together with self adhesive tabs. The present invention may also include pre-programming 3D video content accessible for the public viewing enjoyment.

The components of the present invention may be cut from sheets of cardboard, fiberboard, plastics or any other light-weight materials that can be inexpensive to fabricate with conventional die cutting methods. The panels may be assembled either by hand or by automation by lining up said elements to a certain position on the main board.

Figure 1:
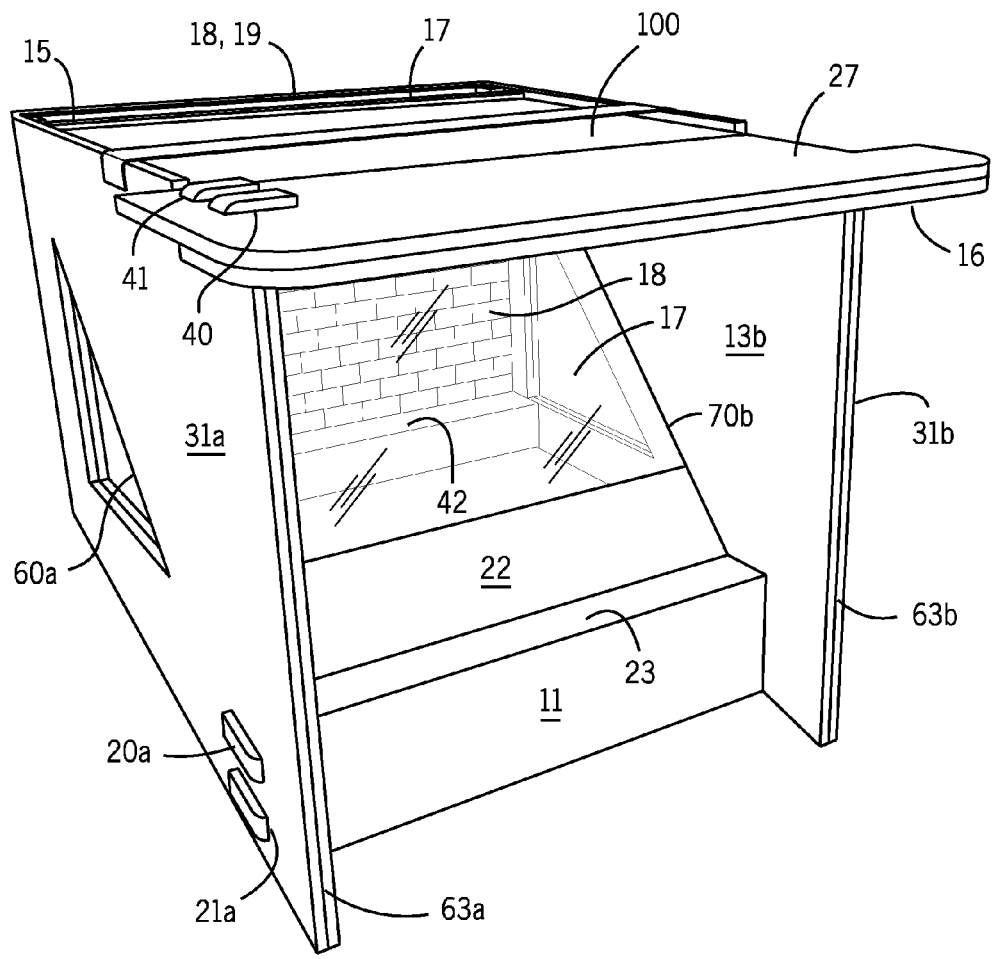
FIG. 1 is a perspective view of an embodiment of the present invention.
Figure 2:
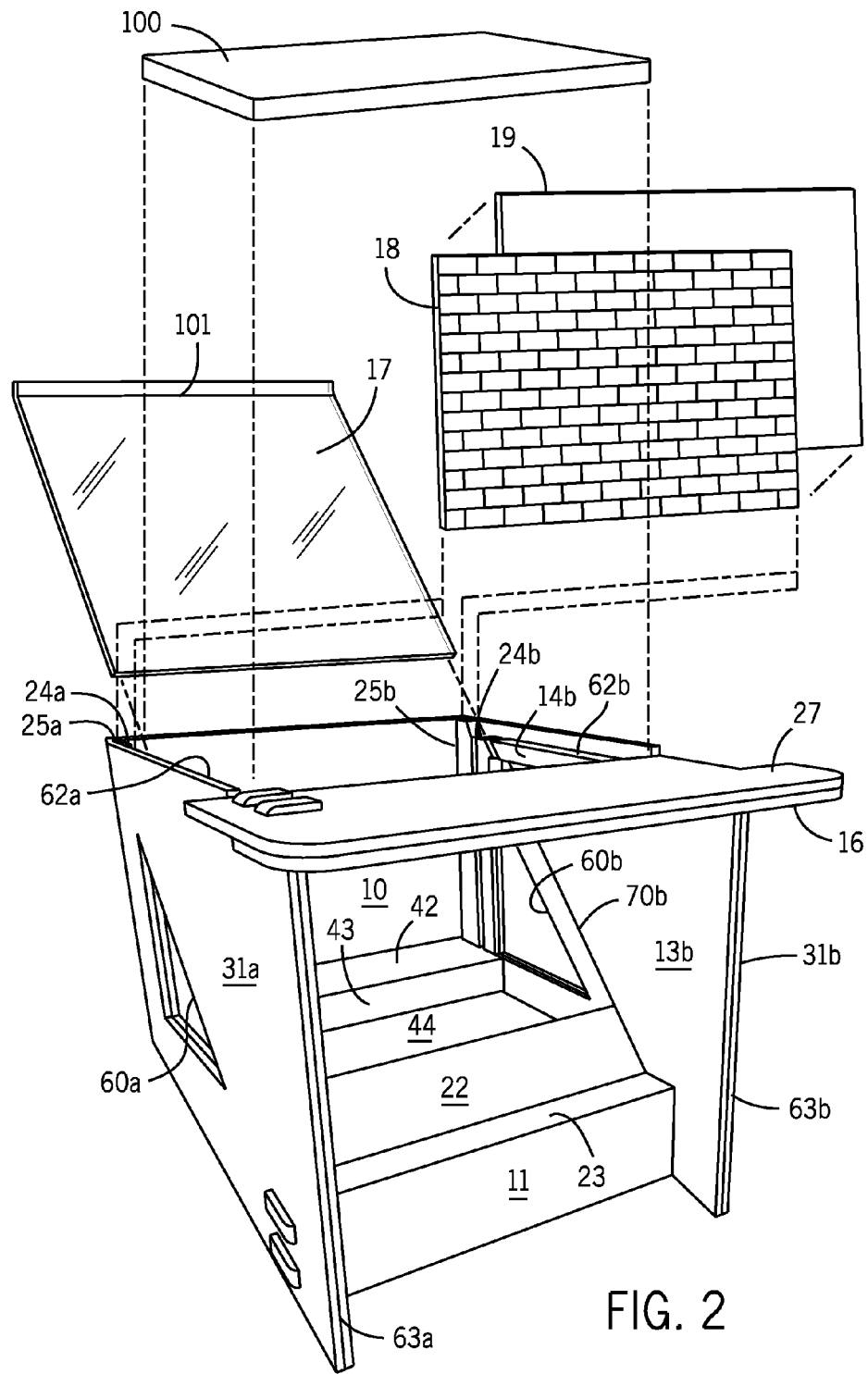
FIG. 2 is an exploded view of the present invention illustrating the removal of the electronic video playing device, the backdrop and the background.
Figure 3:
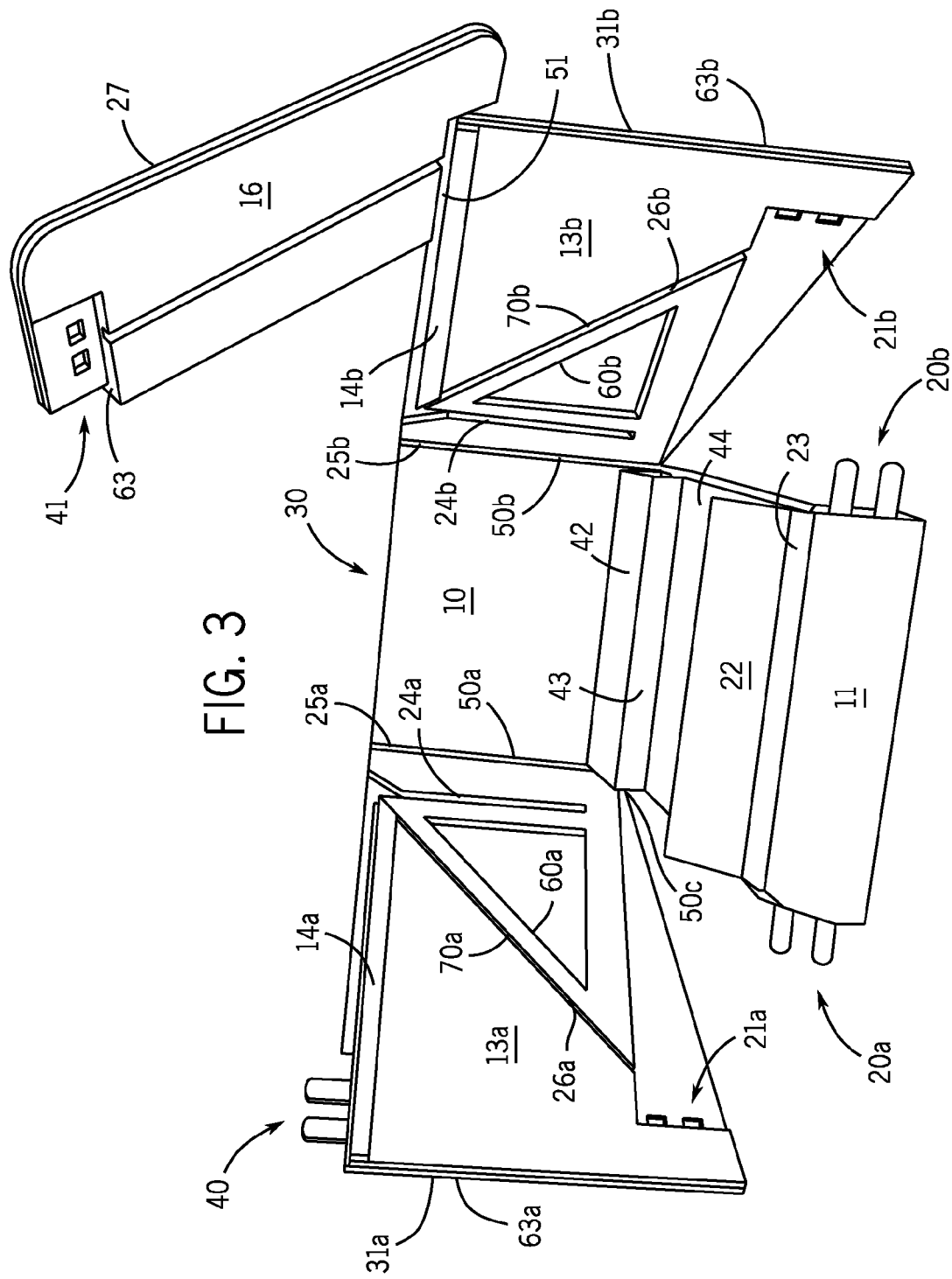
FIG. 3 is a perspective view of the present invention unfolding into a collapsed form.
Figure 4:
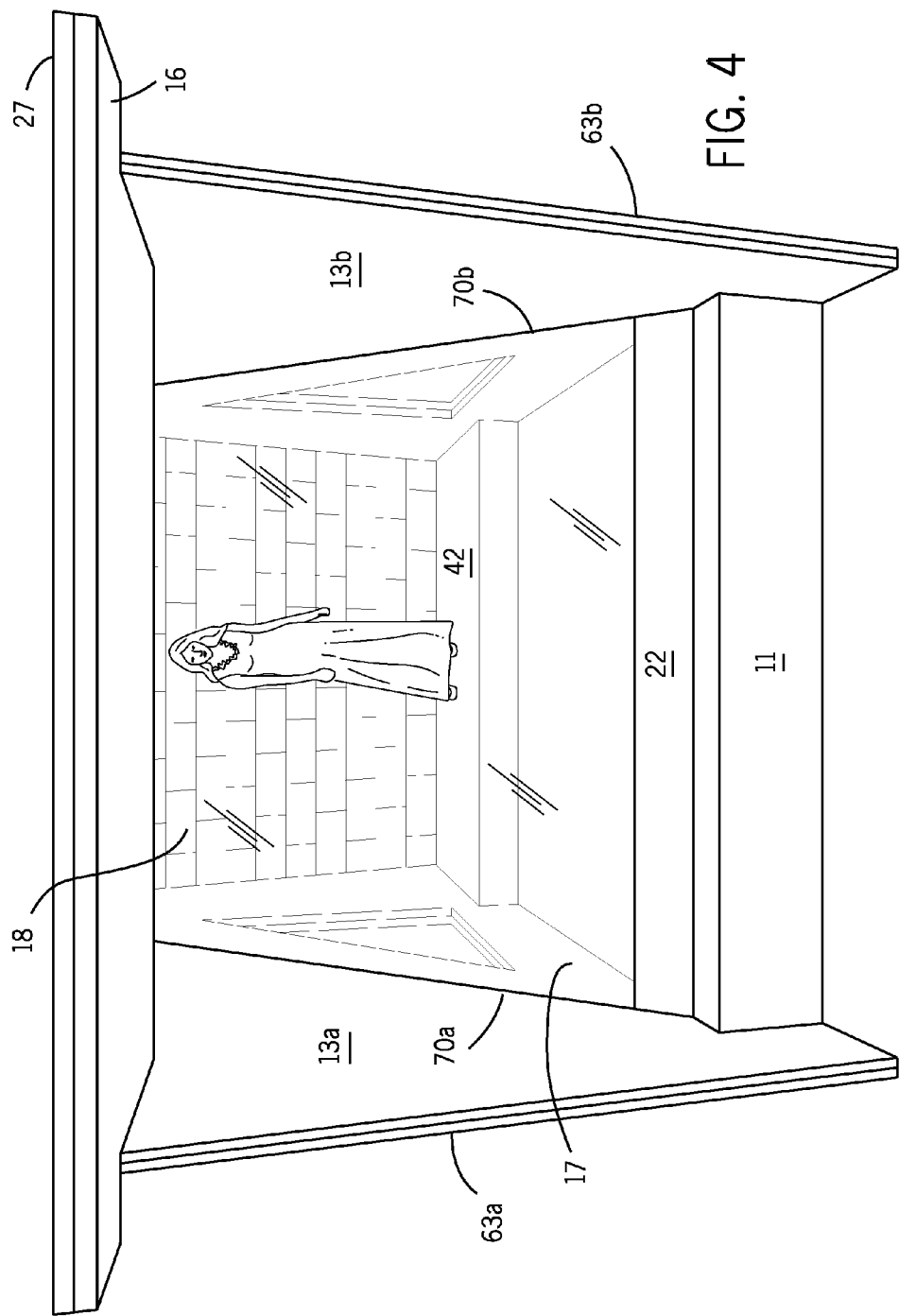
FIG. 4 is a front perspective view of the present invention in use.
Figure 5:
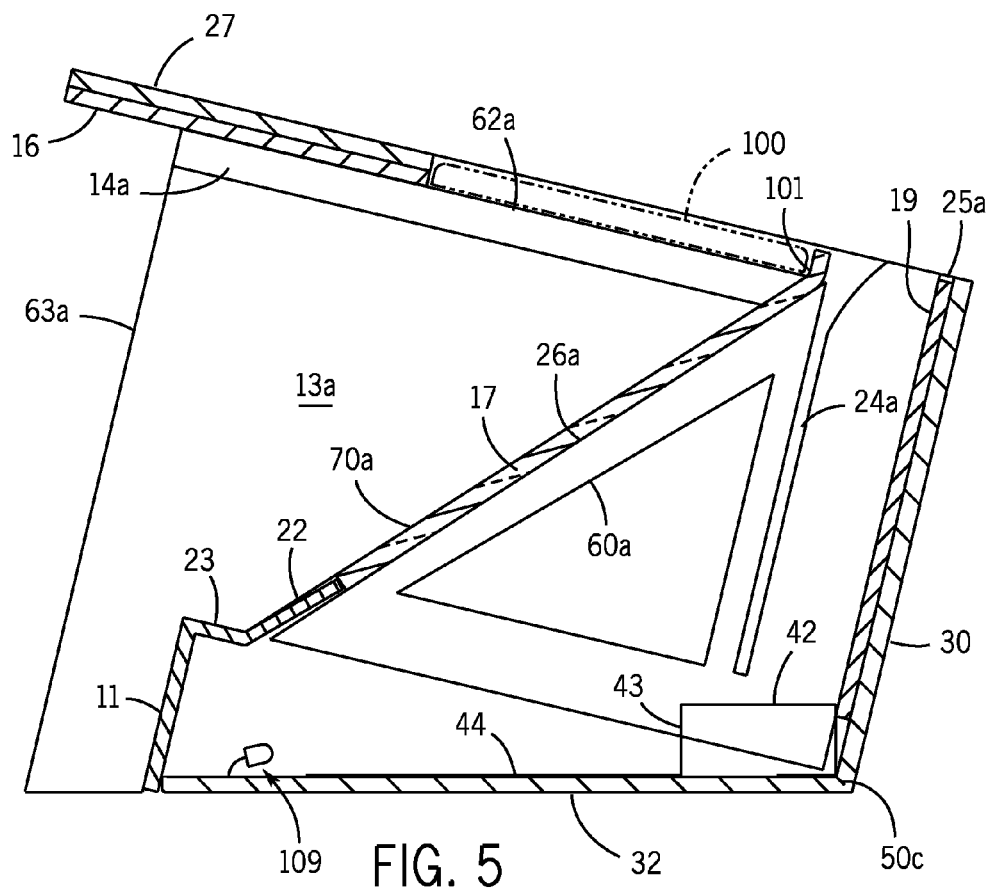
FIG. 5 is a cutaway view of an embodiment of the present invention.
Figure 6:
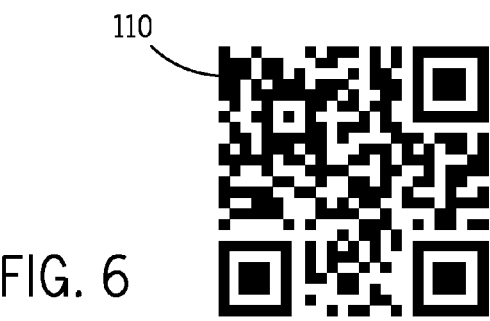
FIG. 6 is an exemplary scannable code.

Referring to FIGS. 1 through 6, the present invention includes a holographic producing housing 10. The housing 10 includes a base panel 32 having a first side, a second side opposite the first side, a back end and a front end opposite the back end. The base panel 32 is formed to rest on a surface to support the housing 10 in an upright position. The housing 10 further includes a first side panel 31a vertically extending from the first side of the base panel 32 and a second side panel 31b vertically extending from a second side of the base panel 32. A back panel 30 vertically extends from the back end of the base panel 32 and a floor panel 11 extends partially upwards from the front end of the base panel 32. A front opening is formed leading into the housing in between an upper edge 23 of the floor panel 11, and front edges 63a, 63b of the first side panel 31a and the second side panel 31b. The first side panel 31a and the second side panel 31b each include an aligning diagonal slot 26a and 26b. The slots 26a and 26b extend from the back end to the front end and are sized to receive and secure a reflective window 17 within. A receiver 62a and 62b is formed on the housing to secure an electronic video playing device 100 within so that a screen of the electronic video playing device 100 is directed towards the reflective window 17 at an angle from about 40 degrees to about 50 degrees.

The present invention may easily be folded and unfolded from a compressed flat position to an expanded position. In such embodiments, the panels 11, 30, 31a, 31b, 32, may be hingedly connected together by creases 50a, 50b, 50c. For example, the first side panel 31a may be connected by a crease 50a to the back panel 30, the second side panel 31b may be connected by a crease 50b to the back panel 30 and the back panel 30 may be connected to the base panel 32 by a crease 50c, so that the panels fold relative to one another. When the housing 10 is in an expanded position, the first side panel 31a and the second side panel 31b may releasably attach to the floor panel 11, securing the housing 10 in the erected position. For example, the floor panel 11 may include projecting tabs 20a, 20b that mate with and secure within slots 21a, 21b formed in the side panels 31a, 31b.

The present invention may further include first vertical slots 24a, 24b and second vertical slots 25a, 25b. The first side panel 31a and the second side panel 31b may each include aligning first vertical slots 24a, 24b extending from a top to a bottom of the first side panel 31a and the second side panel 31b. The aligning first vertical slots 24a, 24b are sized to receive and secure a background scene 18 within. The first side panel 31a and the second side panel 31b may each include aligning second vertical slots 25a, 25b extending from a top to a bottom of the first side panel 31a and the second side panel 31b. The aligning second vertical slots 25a, 25b are sized to receive and secure a backdrop scene 19 within. The first vertical slots 24a, 24b and second vertical slots 25a, 25b allow different scenes to be placed at different depths to provide different effects of the displayed hologram.

In certain embodiments, each of the first side panel 31a and the second side panel 31b may include inner support panels 13a, 13b. The inner support panels 13a, 13b may provide addition support to the side panels 31a, 31b. In such embodiments, the inner support panels 13a, 13b may include the first vertical slots 24a, 24b and the second vertical slots 25a, 25b. The inner support panels 13a, 13b may include inner edges 70a, 70b that align with the diagonal slot 26a and 26b so that the reflective window 17 may fit within. In certain embodiments, each of the inner support panels 13a, 13b and the side panels 31a, 31b may include triangular openings 60a, 60b in between the diagonal slots 26a, 26b and the back panel 30 to allow light to enter.

The present invention may further includes a stage portion 44. The stage portion 44 is attached the base panel 32 and adjacent to the back panel 30. In certain embodiments, the stage portion 44 includes a riser 43 and a stage floor 42. The stage floor 42 protrudes from the base panel 32. The stage floor 42 is at a height from the base panel 32 so that the illusion projected from the reflective window 17, such as a miniature hologram performer, will appear walking across the stage floor 42.

The floor panel 11 of the present invention may be attached to the front end of the base panel 32 at a crease or alternatively may be a separate panel. As mentioned above, the floor panel 11 may attach to the side panels 31a, 31b via projecting tabs 20a, 20b that mate with and secure within slots 21a and 21b. The floor panel 11 may further include an upper portion 22. The upper portion 22 may fit within the bottom of the aligning slots 26a and 26b. Therefore, when the reflective window 17 is inserted into the aligning slots 26a, 26b, the reflective window 17 may rest against the upper portion 22. In certain embodiments, the upper portion 22 and the reflective window 17 may attach by an adhesive. The light 109 may be a light emitting diode. The light emitting diode is attached to the bottom panel 32 near the floor panel 11 within the housing 10. The floor panel 11 covers the light 109 so that a viewer looking through the front opening is unable to see the light emitting diode.

In certain embodiments, the receiver 14a, 14b is formed from a first ridge 14a protruding from a top of the first side panel 31a and a second ridge 14b protruding from a top of the second side panel 31b. The first ridge 14a and the second ridge 14b form a top opening in between. The ridges 14a, 14b are operable to secure edges of the electronic video playing device 100 so that the screen is disposed in between the top opening. Therefore, the electronic video playing device 100 is disposed above the reflective window 17 so that a character from video streaming from the screen is reflected off of the reflective window 17 creating an illusion that the character is actually on the stage floor 42.

In certain embodiments, the present invention may include a top panel 27 hingedly attached to the top of the second side panel by a crease 51. The top panel 27 may fold over and releasably attachable to the top of the first side panel 31a via at least one tab 40 and at least one slot 41. In such embodiments the top opening may be formed in between the top panel 27, the first ridge 14a, the second ridge 14b and a lip 101 formed on the top end of the reflective window 17. An underlining panel 16 fits under the top panel 27. The underlining panel 16 may include a lip 63 at the edge facing the stage. The underside lip 63 may be a part of the receiver 14a, 14b.

As mentioned above, the housing may be made of five connected sections, a back panel 30, two side panels 31a, 31b, a base panel 32 and a folding top panel 27. The apparatus material can be made of cardboard, fiberboard, plastic or wood materials or any other light weight yet sturdy material. The thickness of the material can be from approximately ⅛" to ¼", such as about 3/16". With the housing 10 laid out flat the length can be variable in size from approximately 32" to 36", such as about 34". When expanded together the width of the housing 10 can be from about 9" to 10", such as about 9.5" in width. The height of the housing 10 expanded together range from about 7" to 8", such as about 7.5". The housing 10 when expanded can be variable in length and width at the top edge to accommodate the varying sizes of tablets and similar personal video screens commercially available to the general public.

The stage portion 44 may include a prop (miniature furniture, piano, etc) on the stage floor 42 and/or a scenic illustrated background. The reflective window 17 may be mounted in the housing 10 at an angle of about 40 degrees to about 50 degrees, such as about 45 degrees. The slots 70a, 70b and slots 26a, 26b may have a thickness so that the edges of the reflective window 17 snugly fit within. The reflective window 17 may be an acrylic plastic clear material or glass sturdy enough to maintain its shape while in position at an inclined angle. The thickness of the reflective window 17 may be approximately 1/8" to 1/4", such as 3/16". The length of the reflective window 17 may be from about 10" to about 11", such as about 10½". At the top end of the mirror is a curved lip 101 approximately ½" high at a 45 degree angle used to hold the electronic video playing device 100 in place. The reflective window 17 can be comprise of a thin protective layer of reflective coated film that would be adhered onto the side of the reflective window 17 facing the screen.

The scenic background 18 may be placed in the housing 10 and is positioned on the same vertical plane as the projected virtual image of the reflected hologram image. When superimposed on top of one another they would create a series of images that would interact visually with each other. In certain embodiments, behind each scenic background 18 would be a QR scanning code 110 that would relate to a video scene downloaded from a website. The downloaded video scene would correspond to the scenic background 18.

The backdrop 19 may be put into position at the rear of the stage floor 42 by inserting into slots 25a and 25b. The scenic backdrop 19 may be used to create an illusion of stage depth with the virtual image of the reflected hologram. The scenes on the backdrop 19 may include stage drapes, lighting fixtures, band members, etc. Behind each scenic backdrop 19 may be a QR scanning code that would relate to a video scene downloaded from a website. These scenes would primarily be hologram images of performers on the stage floor 42 with the scenic backdrop 19 being used to create perceptions of depth.

The video playing device 100 is used to create the hologram effect. This device could be a tablet or any other video image device that would be able to fit into the top edge dimensions of the housing 10. The video playing device 100 may include the customers own device and would be used with the housing 10 to create enjoyment in viewing video scenes in a hologram format. This hologram Peppers Ghost imaging apparatus may provide hours of excitement and entertainment pleasure.

It should be understood, of course, that the foregoing relates to exemplary embodiments of the invention and that modifications may be made without departing from the spirit and scope of the invention as set forth in the following claims.

What is claimed is:

1. A holographic image producing housing comprising:
    a base panel having a first side, a second side opposite the first side, a back end and a front end opposite the back end, wherein the base panel is formed to rest on a surface to support the housing in an upright position;
    a first side panel extending from the first side of the base panel and a second side panel extending a second side of the base panel, wherein the first side panel and the second side panel each comprise an aligning diagonal slot formed on an inner surface;
    a back panel extending from the back end of the base panel, wherein a top opening is formed in between upper edges of the back panel, the first side panel and the second side panel;
    a floor panel extending upwards from the front end of the base panel, wherein a front opening is formed leading into the housing in between an upper edge of the floor panel, and front edges of the first side panel and the second side panel;
    a reflective window disposed within the aligning diagonal slots of the first side panel and the second side panel; and
    a light secured within the housing and positioned to direct light on the back panel,
    wherein a receiver is formed at the top opening of the housing to secure an electronic video playing device within so that a screen of the electronic video playing device is disposed above and facing towards the reflective window at an angle from about 40 degrees to about 50 degrees so that a video streaming from the screen is reflected off of the reflective window creating a holographic image within the housing.

2. The housing of claim 1, wherein the panels are hingedly connected to each other by a crease, wherein folding about the creases forms a compressed position and an expanded position.

3. The housing of claim 2, wherein the first side panel and the second side panel are hingedly connected to the back panel, and the back panel is hingedly connected to the bottom panel.

4. The housing of claim 3, wherein the first side panel and the second side panel are releasably attachable to the floor panel via tabs and slots.

5. The housing of claim 1, further comprising a stage portion attached to and protruding from the base panel and adjacent to the back panel.

6. The housing of claim 1, wherein the first side panel and the second side panel each comprise an aligning vertical slot extending from a top to a bottom of the first side panel and the second side panel, wherein the aligning vertical slots are sized to receive and secure a background within.

7. The housing of claim 6, wherein the background comprises an image.

8. The housing of claim 7, wherein the background comprises a code scannable by the electronic video playing device, wherein the code links the electronic video playing device to a video that corresponds with the image.

9. The housing of claim 1, wherein the first side panel and the second side panel each comprise an opening formed therethrough.

10. The housing of claim 1, wherein the receiver is formed from a ridge protruding near a top of the first side panel and the second side panel, and forming an opening in between, wherein the ridges are operable to secure edges of the electronic video playing device so that the screen is disposed in between the opening.

11. The housing of claim 1, further comprising top panel hingedly attached to the top of the second side panel and releasably attachable to the top of the first side panel via at least one tab and at least one slot.

12. The housing of claim 1, wherein an upper portion of the floor panel is disposed within the aligning diagonal slots so that the reflective window rests against the upper portion.

13. The housing of claim 1, wherein the light is a light emitting diode.

14. The housing of claim 13, wherein the light emitting diode is attached to the bottom panel near the floor panel within the housing.

* * * * *